United States Patent
Sabapathi et al.

(10) Patent No.: US 10,004,087 B2
(45) Date of Patent: Jun. 19, 2018

(54) SYSTEM AND METHOD FOR DECODING DATA CARRIED ON COLLIDING CHANNELS

(71) Applicant: QUALCOMM Incorporated, San Diego, CA (US)

(72) Inventors: Karthikeyan Sabapathi, Hyderabad (IN); Mahender Reddy Akkapally, Chelmeda (IN); Praveen Peruru, Hyderabad (IN); Harinath Reddy Patel, Mahabubnagar (IN); Anand Chowdhary Kolluri, San Diego, CA (US); Krishna Murthy Sastry Bhamidipati, Hyderabad (IN); Pankaj Gupta, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 128 days.

(21) Appl. No.: 15/293,236

(22) Filed: Oct. 13, 2016

(65) Prior Publication Data
US 2018/0110072 A1    Apr. 19, 2018

(51) Int. Cl.
H04W 4/00    (2018.01)
H04W 74/08    (2009.01)
H04W 72/08    (2009.01)

(52) U.S. Cl.
CPC ..... *H04W 74/0816* (2013.01); *H04W 72/082* (2013.01)

(58) Field of Classification Search
CPC .................. H04W 74/0816; H04W 72/082
(Continued)

(56) References Cited

U.S. PATENT DOCUMENTS 7,974,643 B2 *    7/2011    Catovic ............... H04W 68/02
                                                                 455/445
8,432,812 B2    4/2013    Park et al.
(Continued)

FOREIGN PATENT DOCUMENTS

EP    0864241 A2    9/1998
WO    2013012742 A2    1/2013

OTHER PUBLICATIONS

Ericsson: "Mobility Impact from Ptm MBMS Data Reception", 3GPP Draft; R2-032497, 3rd Generation Partnership Project (3GPP), Mobile Competence Centre ; 650, Route Des Lucioles ; F-06921 Sophia-Antipolis Cedex ; France, vol. RAN WG2, No. San Diego, USA, Nov. 24, 2003, XP050124785, [retrieved on Nov. 24, 2003], 3 pages.

(Continued)

*Primary Examiner* — Wutchung Chu
(74) *Attorney, Agent, or Firm* — Arent Fox, LLP & Qualcomm Incorporated

(57) ABSTRACT

An apparatus may communicate with at least two networks. The apparatus may be configured to opportunistically decode a channel from a first network and a channel from a second network in order to receive data from both networks. The apparatus may determine whether first data carried on a paging channel (PCH) is decodable from a subset of slots that carry the PCH. The subset of slots may be included in a set of slots that carry the PCH. When the PCH collides with a physical multicast channel (PMCH), the apparatus may decode second data carried on the PMCH instead of the first data when the first data is determined to be decodable from the subset of slots that carry the PCH, and decode the first data instead of the second data when the first data is not determined to be decodable from the subset of slots that carry the PCH.

30 Claims, 14 Drawing Sheets

(58) Field of Classification Search
USPC .......................................................... 370/329
See application file for complete search history.

(56) References Cited

U.S. PATENT DOCUMENTS

| | | | |
|---|---|---|---|
| 8,787,262 B2 | 7/2014 | Dhanda et al. | |
| 8,880,106 B2 | 11/2014 | Dhanda et al. | |
| 9,681,409 B2* | 6/2017 | Sorrentino | H04W 56/002 |
| 2005/0054331 A1* | 3/2005 | Balachandran | H04W 72/005 |
| | | | 455/414.1 |
| 2008/0287134 A1* | 11/2008 | Catovic | H04W 68/02 |
| | | | 455/445 |
| 2010/0003978 A1* | 1/2010 | Catovic | H04W 60/00 |
| | | | 455/435.1 |
| 2010/0279698 A1 | 11/2010 | Wong | |
| 2011/0096706 A1* | 4/2011 | Ramasamy | H04W 68/12 |
| | | | 370/310 |
| 2012/0014269 A1 | 1/2012 | Ray et al. | |
| 2013/0107776 A1* | 5/2013 | Batchu | H04W 68/025 |
| | | | 370/311 |
| 2013/0150105 A1 | 6/2013 | Clevorn et al. | |
| 2016/0007292 A1* | 1/2016 | Weng | H04W 52/0235 |
| | | | 370/311 |
| 2016/0174195 A1 | 6/2016 | Lee et al. | |

OTHER PUBLICATIONS

International Search Report and Written Opinion—PCT/US2017/051634—ISA/EPO—dated Dec. 18, 2017.

* cited by examiner

SYSTEM AND METHOD FOR DECODING DATA CARRIED ON COLLIDING CHANNELS

BACKGROUND

Field

The present disclosure relates generally to communication systems, and more particularly, to a user equipment configured to decode data carried on channels that collide at the user equipment.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An apparatus may communicate with at least two networks. The apparatus may be configured to opportunistically decode a channel from a first network and a channel from a second network in order to receive data from both networks. In an aspect of the disclosure, a method, a computer-readable medium, and an apparatus are provided. The apparatus may be configured to determine whether first data carried on a paging channel (PCH) is decodable from a subset of slots that carry the PCH. The subset of slots may be included in a set of slots that carry the PCH. When the PCH collides with a physical multicast channel (PMCH), the apparatus may be configured to decode second data carried on the PMCH instead of the first data when the first data is determined to be decodable from the subset of slots that carry the PCH, and decode the first data instead of the second data when the first data is not determined to be decodable from the subset of slots that carry the PCH. In an aspect, when the PCH collides with the PMCH, the apparatus may be configured to decode the first data from the subset of slots that carry the PCH when the first data is determined to be decodable from the subset of slots that carry the PCH. In an aspect, the first data may include a paging message intended for the UE and the second data may include one of multicast channel scheduling information (MSI) or evolved multimedia multicast and broadcast services (eMBMS) data intended for the UE. In an aspect, the apparatus may be configured to determine whether the PCH collides with the PMCH. In an aspect, the apparatus may be configured to determine that a first slot of the set of slots that carry the PCH at least partially overlaps with a first subframe that carries the PMCH. In an aspect, the apparatus may be configured to receive at least one system information block (SIB) and determine first scheduling information associated with the second data based on the SIB. In an aspect, the apparatus may be configured to decode an MSI carried on the PMCH based on the first scheduling information, and determine second scheduling information associated with eMBMS data based on the decoded MSI. In an aspect, the apparatus may be configured to determine paging occasions for the PCH based on a discontinuous reception cycle (DRX) of the apparatus. In an aspect, the apparatus may be configured to determine whether the first data carried on the PCH is decodable from the subset of slots that carry the PCH by determining a signal-to-noise ratio (SNR) associated with the PCH and comparing the determined SNR to a predetermined threshold. In an aspect, the apparatus may be configured to determine whether the first data carried on the PCH is decodable from the subset of slots that carry the PCH by determining whether at least one paging message carried on the PCH was previously decoded using a previous subset of slots that carried the PCH, the previous subset of slots included in a previous set of slots that carried the PCH. In an aspect, the first data carried on the PCH is repeated in a respective first slot of four consecutive frames. In an aspect, the apparatus may include at least a first subscriber identity module (SIM) for receiving the PCH from a first network and a second SIM for receiving the PMCH from a second network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
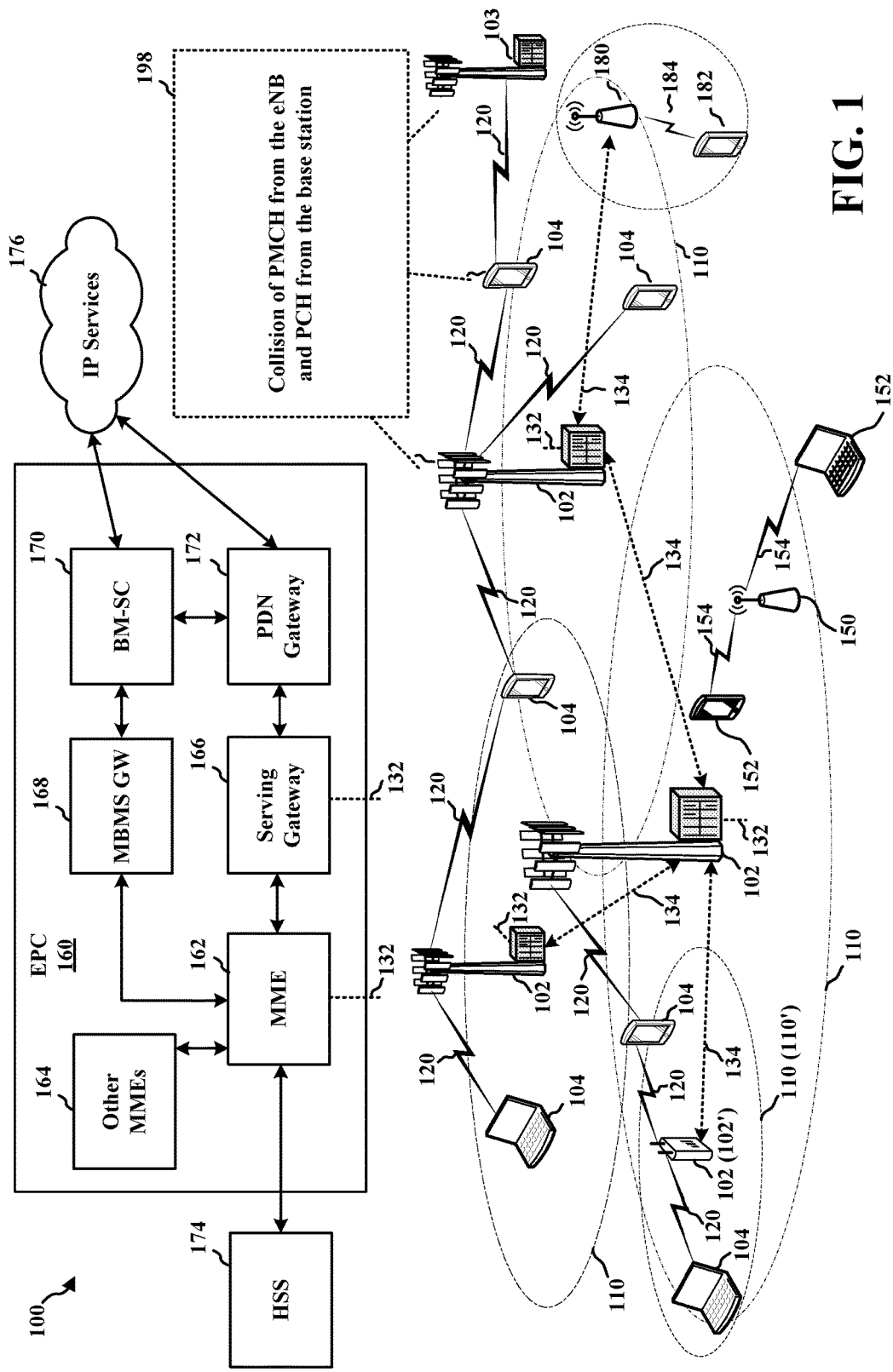
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to communicate with two different radio access networks (RANs). For example, the UE 104 may include a respective subscriber identity module (SIM) for each RAN. The UE 104 may be configured to communicate with a first RAN via the eNB 102 and the second RAN via the base station 103. In an aspect, the first RAN may be an LTE RAN (e.g., a fourth generation or 4G RAN), whereas the second RAN may be a Global System for Mobile Communication (GSM) RAN (e.g., a third generation or 3G RAN).

According to an aspect, the eNB 102 may transmit data on a physical multicast channel (PMCH), such as data associated with evolved MBMS (eMBMS). The base station 103 may transmit data on a paging channel (PCH), such as paging data. In an aspect, the base station 103 may repeatedly transmit the same paging data on the PCH. For example, the base station 103 may transmit the same paging data in the first slot of four consecutive frames during a paging occasion. Based on the repetition of the paging data by the base station 103, the UE 104 may be configured to determine the paging data based on a subset of the four slots of the PCH. Accordingly, the UE 104 may be configured to determine whether that paging data carried on the PCH is decodable from that subset of the slots that carry the PCH.

When UE 104 determines that there is a collision 198 of the PCH and the PMCH, the UE 104 may be configured to prioritize one channel over another. One approach to collisions of the PMCH and the PCH is the mutually exclusive decoding of one or the other based on forward error correction (FEC) associated with eMBMS. For example, the UE 104 may compute an FEC for eMBMS data. As the FEC approaches a threshold that is required for eMBMS, the UE 104 may prioritize decoding of the PMCH over decoding of the PCH. The UE 104 may compare the computed FEC to a predetermined threshold that is below the threshold required for eMBMS (e.g., so that eMBMS services are not interrupted). Based on the comparison, the UE 104 may either prioritize eMBMS services or paging data. That is, when the computed FEC does not exceed the predetermined threshold, the UE 104 may prioritize decoding of the PCH over decoding of the PMCH. When the computed FEC exceeds the predetermined threshold, the UE 104 may prioritize decoding of the PMCH over the PCH. This approach may not allow data from both the PMCH and the PCH to be decoded when the PMCH collides with the PCH, for example, during a single paging occasion.

In aspects of the present disclosure, the UE 104 may be configured to decode both paging data and eMBMS data even when there is a collision 198 because the UE 104 may be configured to decode paging data from the PCH based on the subset of slots that carry repetitions of the paging data. When a collision 198 occurs, the UE 104 may be configured to decode data carried on the PMCH instead of the data carried on the PCH when the UE 104 determines that the data carried on the PCH is decodable from the subset of slots that carry the PCH. Additionally, the UE 104 may be configured to decode data carried on the PCH from the subset of slots, for example, at slots that do not overlap with subframes of the PMCH carrying eMBMS data for the UE 104. However, the UE 104 may be configured to decode data carried on the PCH instead of data carried on the PMCH when the UE 104 determines that the data carried on the PCH is not decodable from the subset of slots that carry the PCH.

Figure 2A:
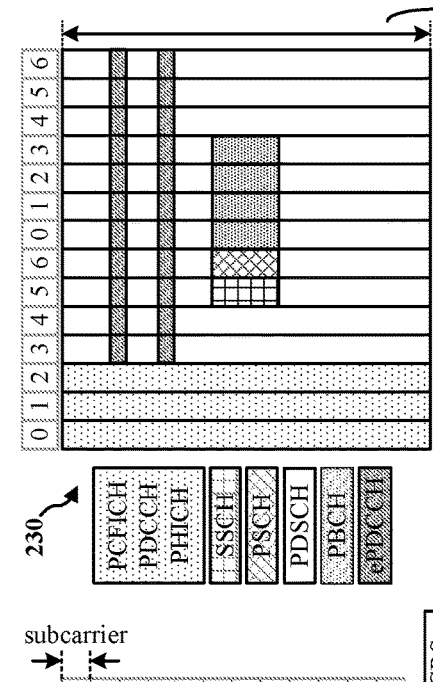
FIGS. 2A, 2B, 2C, and 2D are diagrams illustrating LTE examples of a DL frame structure, DL channels within the DL frame structure, an UL frame structure, and UL channels within the UL frame structure, respectively.
Figure 2B:
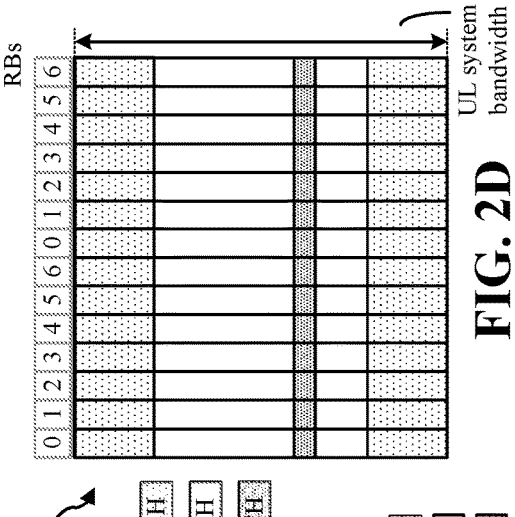
Figure 2C:
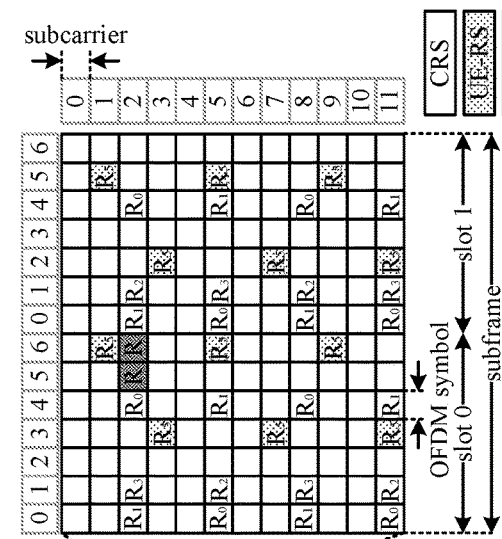
Figure 2D:
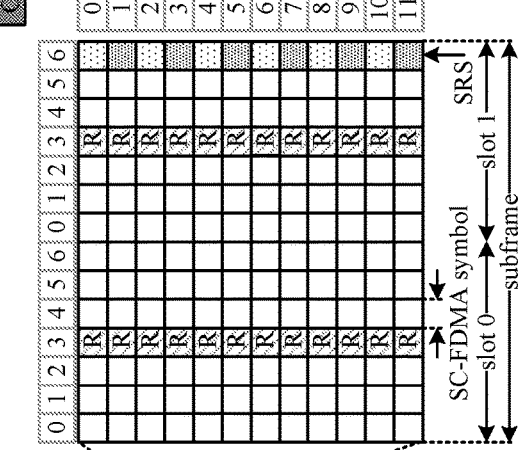

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
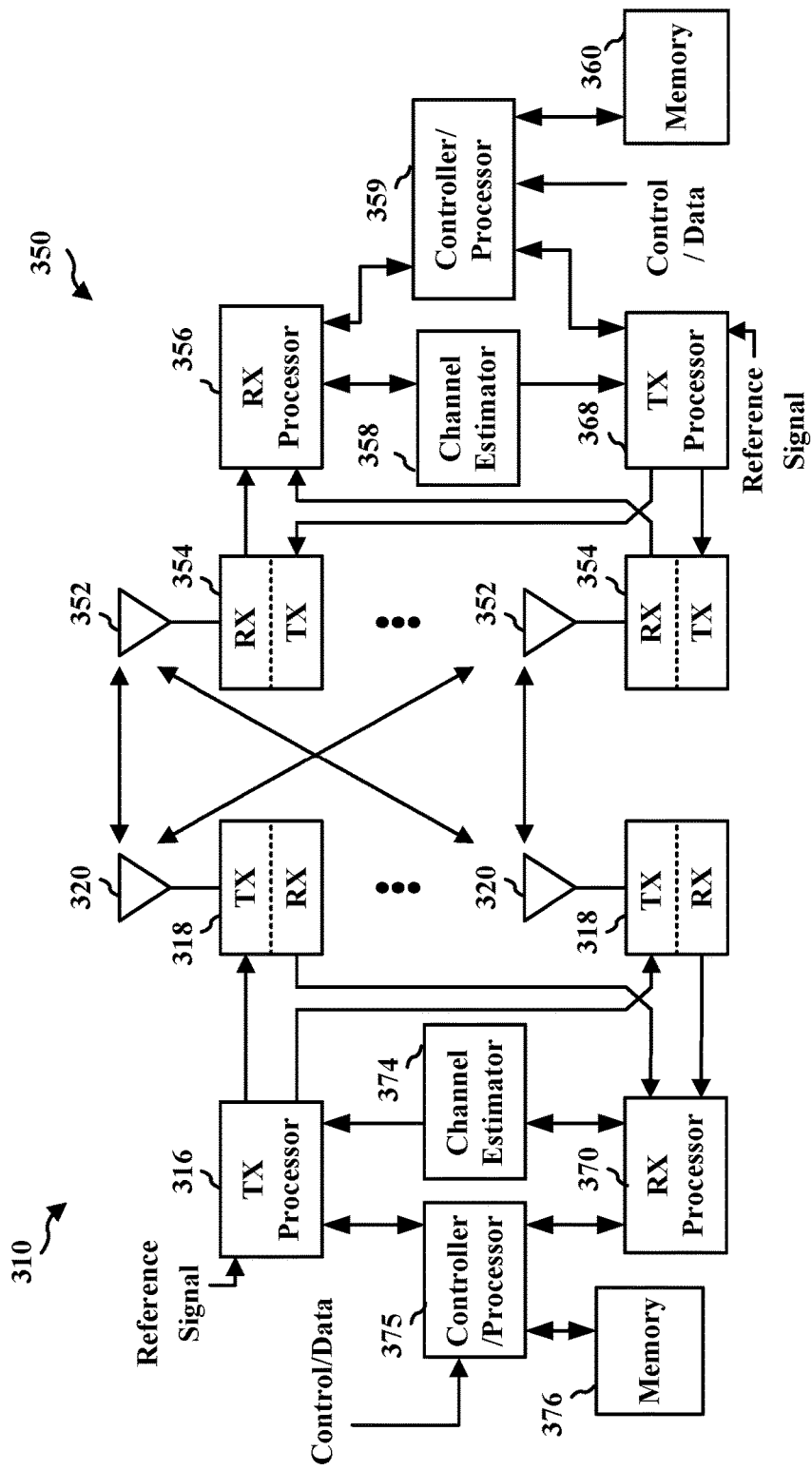
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
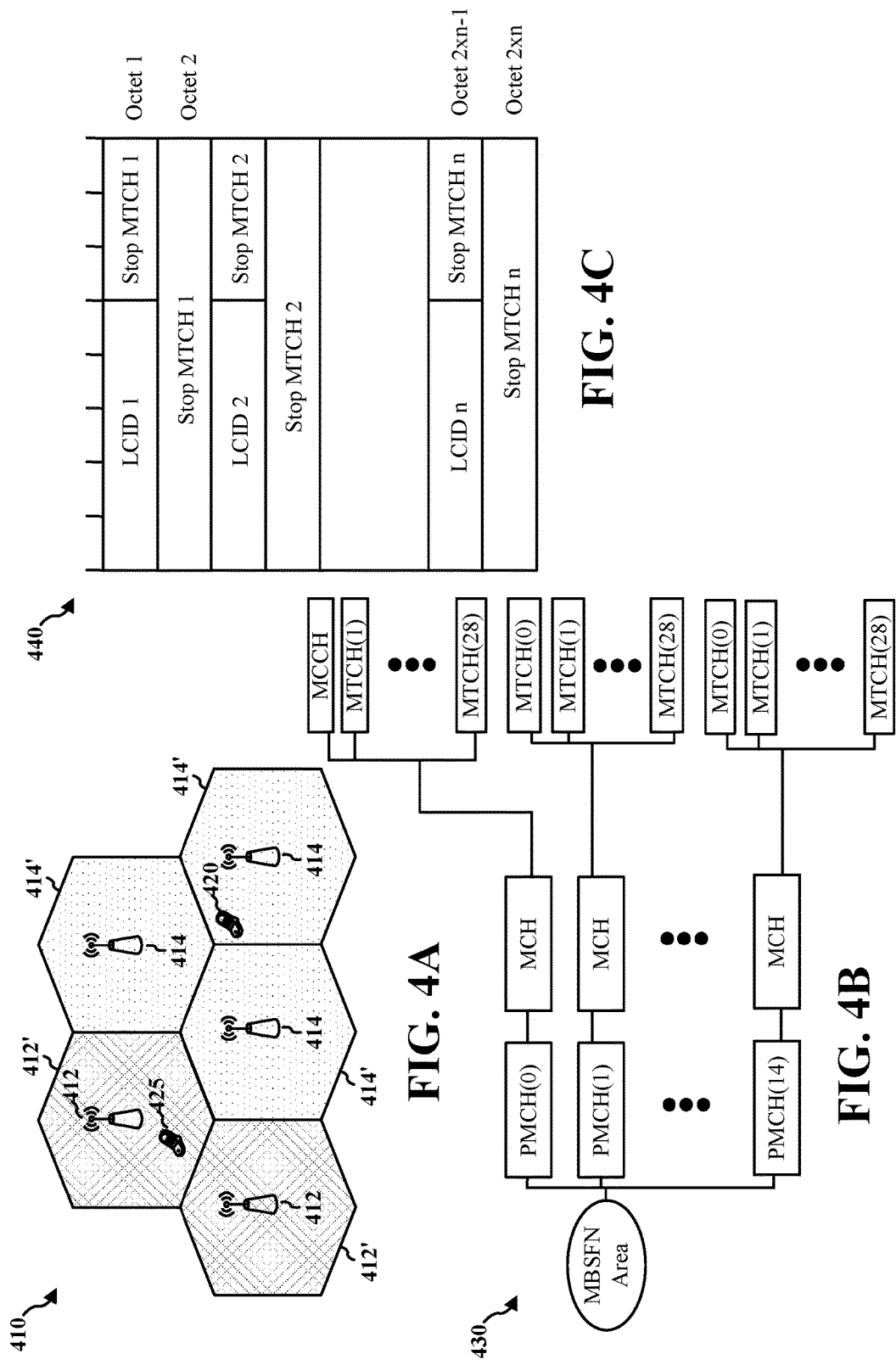
FIG. 4A is a diagram illustrating an example of Multicast Broadcast Single Frequency Network areas in an access network.
FIG. 4B is a diagram illustrating an example of an evolved Multimedia Broadcast Multicast Service channel configuration in a Multicast Broadcast Single Frequency Network.
FIG. 4C is a diagram illustrating a format of a Multicast Channel (MCH) Scheduling Information (MSI) Medium Access Control element.

FIG. 4A is a diagram 410 illustrating an example of MBSFN areas in an access network. The eNBs 412 in cells 412' may form a first MBSFN area and the eNBs 414 in cells 414' may form a second MBSFN area. The eNBs 412, 414 may each be associated with other MBSFN areas, for example, up to a total of eight MBSFN areas. A cell within an MBSFN area may be designated a reserved cell. Reserved cells do not provide multicast/broadcast content, but are time-synchronized to the cells 412', 414' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 4A, the first MBSFN area may support a first eMBMS broadcast service, such as by providing a particular news broadcast to UE 425. The second MBSFN area may support a second eMBMS broadcast service, such as by providing a different news broadcast to UE 420.

FIG. 4B is a diagram 430 illustrating an example of an eMBMS channel configuration in an MBSFN. As shown in FIG. 4B, each MBSFN area supports one or more physical multicast channels (PMCH) (e.g., 15 PMCHs). Each PMCH corresponds to an MCH. Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. Initially, the UE may acquire a SIB 13 (SIB13). Subsequently, based on the SIB13, the UE may acquire an MBSFN Area Configuration message on an MCCH. Subsequently, based on the MBSFN Area Configuration message, the UE may acquire an MSI MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted. A particular TMGI identifies a particular service of available MBMSs services.

FIG. 4C is a diagram 440 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area. A logical channel identifier (LCD) field (e.g., LCID 1, LCID 2, . . . , LCID n) may indicate a logical channel identifier of the MTCH. A Stop MTCH field (e.g., Stop MTCH 1, Stop MTCH 2, . . . , Stop MTCH n) may indicate the last subframe carrying the MTCH corresponding to the particular LCID.

Figure 5:
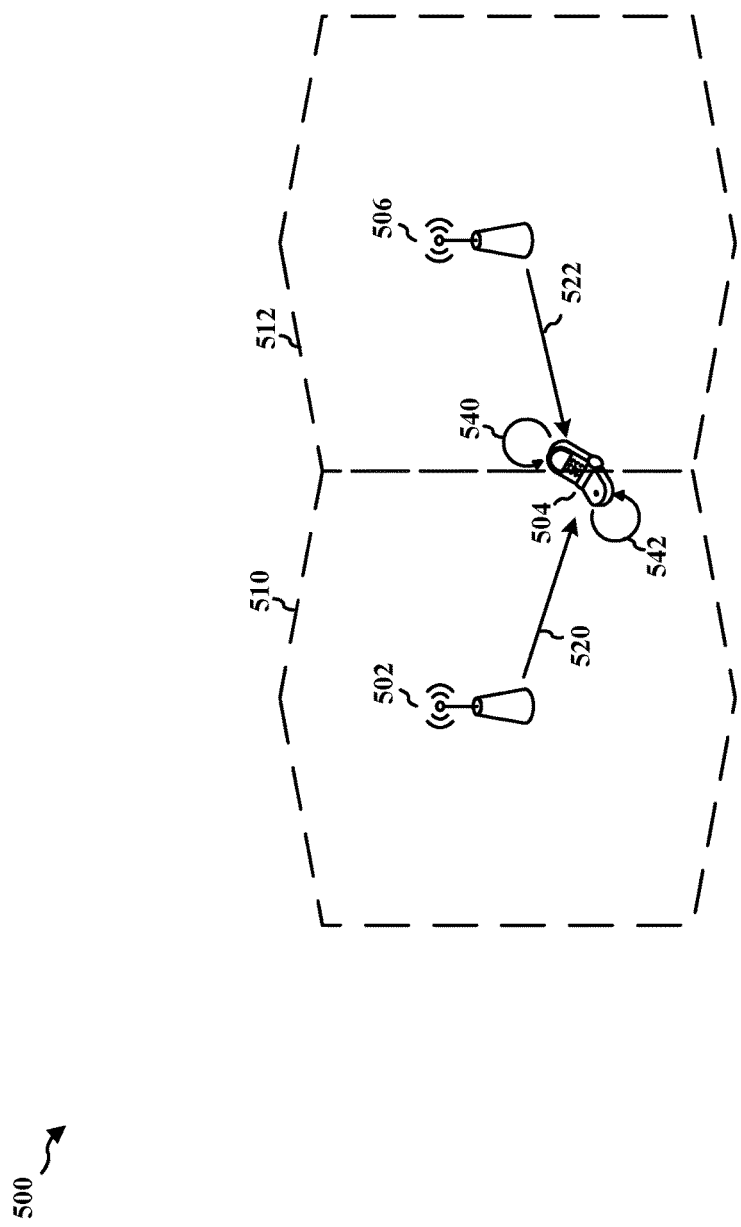
FIG. 5 is a diagram of a wireless communications system.

FIG. 5 is a diagram of a wireless communications system 500. The wireless communications system 500 includes at least one UE 504. In one aspect, the UE 504 may be configured as a machine-type communication (MTC) UE. In one aspect, the UE 504 may include more than one subscriber identity module (SIM). The UE 504 may communicate with a respective RAN using a respective SIM.

The wireless communications system 500 may include at least two base stations 502, 506. In an aspect, the first base station 502 may operate as part of a first RAN (e.g., an LTE RAN). The second base station 506 may operate as part of a second RAN (e.g., a GSM RAN). The UE 504 may be configured to communicate with both RANs. For example, the UE 504 may include a first SIM to communicate with the first RAN including the first base station 502 and, additionally, may include a second SIM to communicate with the second RAN including the second base station 506.

According to an aspect, the first base station 502 may provide eMBMS services to the UE 504. The first base station 502 may transmit a PMCH 520 to the UE 504, which may carry eMBMS data. The PMCH 520 may carry an MSI, which may indicate scheduling information for reception of eMBMS services. From the MSI, the UE 504 may acquire timing and synchronization information related to subframes that carry eMBMS services intended for the UE 504.

The UE 504 may determine timing and synchronization information for the PMCH 520 based on a system information block (SIB) received from the first base station 502. The UE 504 may receive, from the first base station 502, a SIB that indicates scheduling information associated with the PMCH 520. The UE 504 may then be able to decode the MSI carried on the PMCH 520, which may be carried on the first subframe of a PMCH frame.

The second base station 506 may transmit a PCH 522 that carries paging data for the second RAN. Paging data may include a paging message intended for the UE 504. In an aspect, the second base station 506 may repeatedly transmit the same paging data on the PCH (e.g., GSM paging transmissions may be bursty). For example, the second base station 506 may transmit the same paging data in the first slot of four consecutive frames during a paging occasion.

The UE 504 may be configured to observe a paging occasion of the second RAN. The UE 504 may determine a paging occasion based on discontinuous reception (DRX) cycles of the UE 504. The DRX cycles may be acquired by the UE 504 from the second base station 506, for example, via a SIB.

Based on the repetition of the paging data by the second base station 506, the UE 504 may be able to determine paging data from a subset of four slots of the PCH 522 during a paging occasion. That is, the UE 504 may not need to decode all four slots that carry the paging data in order to acquire a paging message.

The UE 504 may be configured to determine 540 whether the paging data carried on the PCH 522 is decodable from the subset of the slots that carry the PCH 522. In one aspect, the UE 504 may determine a signal-to-noise ratio (SNR) associated with the PCH 522. The UE 504 may compare this determined SNR to a predetermined threshold. Based on the comparison, the UE 504 may determine 540 whether the paging data carried on PCH 522 is decodable from a subset of slots of the PCH 522 that carry the paging data. For example, if the determined SNR is too large (e.g., meets or exceeds the threshold), the UE 504 will be able to decode a paging message from the subset of slots of the PCH 522.

In another aspect, the UE 504 may be configured to determine 540 whether the paging data carried on the PCH 522 is decodable from the subset of the slots that carry the PCH based on historical data. The UE 504 may determine that at least one paging message carried on the PCH 522 was previously decoded using a previous subset of slots that carried paging data. For example, the UE 504 may observe that a previous paging message was obtained by decoding data from two or three slots and, therefore, the UE 504 may determine that a next paging message may be obtained by decoding data from two or three slots.

Because the UE 504 may be configured to communicate with two different RANs, the UE 504 may experience a collision between downlink frames (and subframes) of the RANs. A collision may occur when a frame from one RAN having data for the UE 504 at least partially overlaps with another frame from the other RAN having data for the UE 504. For example, an MSI MBSFN subframe occasion for the first RAN may overlap with a paging occasion for the second RAN. If the UE 504 is unable to decode the MSI, then the UE 504 may be unable to determine MTCH scheduling information. In this case, the UE 504 may decode all upcoming MTCH subframes of the PMCH 520 in order to receive data intended for the UE 504, which may cause the UE 504 to remain in a wake-up or high-power state for a longer duration, increase power consumption. Therefore, if decoding of the data from the PCH 522 is prioritized over decoding data from the PMCH 520, then eMBMS quality and/or system performance may be degraded at the UE 504. However, if decoding of the data from the PMCH 520 is prioritized over decoding data from the PCH 522, then the UE 504 may miss paging data.

In an aspect, the UE 504 may be configured to determine whether the PCH 522 collides with the PMCH 520. For example, the UE 504 may determine that the PCH 522 collides with the PMCH 520 when a slot of the subset of slots of the PCH 522 at least partially overlaps with a subframe of the PMCH 520 that carries the eMBMS data for the UE 504 (e.g., MSI or eMBMS services intended for the UE 504). In other words, the UE 504 may determine that the PCH 522 collides with the PMCH 520 when paging data intended for the UE 504 at least partially overlaps with data associated with eMBMS (e.g., MSI, eMBMS services) intended for the UE 504.

In an aspect, the UE 504 may be configured to determine whether the PCH 522 collides with the PMCH 520 based on scheduling information received from the first base station 502 and paging occasions as defined by DRX cycles from the second base station 506. In one aspect, the UE 504 may determine first scheduling information as the subframe that carries the MSI from the first base station 502. If the UE 504 determines that the subframe that carries the MSI at least partially overlaps with a paging occasion defined by DRX cycles from the second base station 506, then the UE 504 may determine that the PCH 522 collides with the PMCH 520.

In one aspect, the UE 504 may determine, based on the MSI, second scheduling information as one or more subframes that carry eMBMS services from the first base station 502. If the UE 504 determines that one or more subframes that carry eMBMS services at least partially overlap with a paging occasion defined by DRX cycles from the second base station 506, then the UE 504 may determine that the PCH 522 collides with the PMCH 520.

When the PCH 522 collides with the PMCH 520, the UE 504 may attempt to decode data carried on both the PCH 522 and the PMCH 520, although one may be prioritized over the other. If the UE 504 determines 540 that data carried on the PCH 522 is decodable from a subset of the slots, the UE 504 may be configured to prioritize decoding data carried on the PMCH 520 over data carried on the PCH 522. For example, if the collision is of the eMBMS services carried on the PMCH 520 and the paging data carried on the PCH 522, the UE 504 may be configured to decode 542 the eMBMS services instead of the paging data. However, the UE 504 may decode 542 the paging data based on slots of the PCH 522 that carry the paging data that do not overlap with subframes of the PMCH 520 carrying eMBMS data intended for the UE 504.

If the UE 504 determines 540 that data carried on the PCH 522 is not decodable from a subset of the slots, the UE 504 may be configured to prioritize decoding data carried on the PCH 522 over data carried on the PMCH 520. For example, if the collision is of the eMBMS services carried on the PMCH 520 and the paging data carried on the PCH 522, the UE 504 may be configured to decode 542 the paging data. In some situations, the UE 504 may be unable decode the eMBMS services data carried on one or more subframes of the PMCH 520.

In one aspect, the UE 504 may prioritize the MSI over the paging data and may decode 542 the MSI instead of the paging data, for example, when the MSI occurs on a subframe of the PMCH 520 that overlaps with the first slot of the PCH 522 carrying paging data. Thus, the UE 504 may decode 542 the MSI carried on the first subframe of a frame of the PMCH 520. The UE 504 may attempt to decode 542 the paging data carried on the remaining three slots of the PCH 522.

Aspects described herein may allow the UE 504 to opportunistically decode both eMBMS data and paging data, even when the PMCH 520 carrying the eMBMS data collides with the PCH 522 carrying the paging data. This approach may improve power consumption (e.g., battery performance) over existing solutions. For example, the MCH scheduling period (MSP) may occur at 160 and/or 320 milliseconds (ms) and the paging occasions of DRX may occur every 470 ms. In this example, a collision would occur on average at every third MSI occasion, which would coincide with a paging occasion. Opportunistically decoding data that occurs during the MSP (e.g., after the MSI is decoded) may reduce the duration of a "wake up" state of the UE 504 when monitoring the PMCH 520 from the first base station 502. In connection therewith, the opportunistic decoding of eMBMS data and paging data may increase the probability that paging messages are received, which may improve page performance key performance indicators (KPIs) while decreasing the block error rate (BLER) for eMBMS services.

While aspects are described herein in the context of eMBMS and paging data, opportunistic decoding of data from channels that collide may be applicable to other technologies. For example, aspects described herein may be extended to LTE-Direct (LTE-D) proximity services (ProSe) detection and communication.

Figure 6:
FIG. 6 is a diagram of frames in a wireless communications system.

FIG. 6 illustrates a block diagram of an MBSFN subframe configuration. The frames 600, 620 may carry the PMCH 520. The frame 600 may be frequency-division duplex (FDD) frame. The frame 620 may be a time-division duplex (TDD) frame. In some aspects, subframes of the frames 600, 620 may be allocated as MBSFN subframes 610. In an FDD system, up to sixty percent of the downlink bandwidth may allocated as MBSFN subframes 610. At most subframes 1, 2, 3, 6, 7, and 8 of the frame 600 may be allocated for eMBMS. In a TDD system, the number of subframes that may be allocated as MBSFN subframes 610 may vary according to the uplink-downlink configuration. For example, according to uplink-downlink configuration 5, at most subframes 3, 4, 7, 8, and 9 may be allocated as MBSFN subframes.

FIGS. 7-11 illustrate wireless communications systems according to various aspects. The first frames 700, 800, 900, 1000, 1100 may carry the PMCH 520, and may be aspects of the frame 600. The second frames 720, 820, 920, 1020, 1120 may carry the PCH 522, a slot of which may have a duration of approximately 0.557 ms. The first frames 700, 800, 900, 1000, 1100 may have a different duration then the second frames 720, 820, 920, 1020, 1120. For example, the first frames 700, 800, 900, 1000, 1100 may be LTE frames having a respective duration of ten (10) ms. In an aspect, the first frames 700, 800, 900, 1000, 1100 may represent an MSP. In an aspect, the second frames 720, 820, 920, 1020, 1120 may be GSM frames having a duration of approximately 4.65 ms. The second frames 720, 820, 920, 1020, 1120 may represent a paging occasion, for example, according to a DRX configuration.

Figure 7:
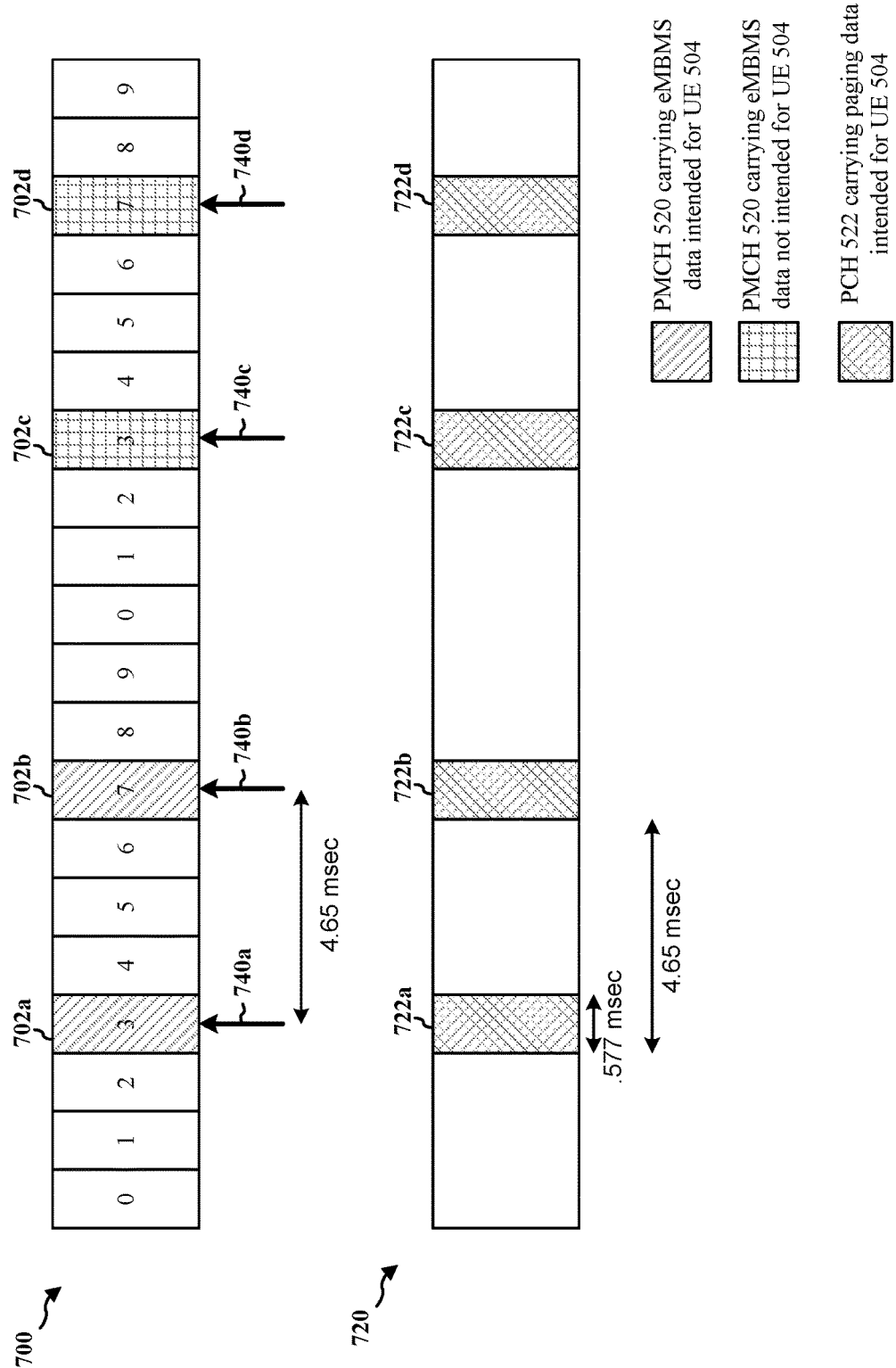
FIG. 7 is a diagram of frames in a wireless communications system.

First with respect to FIG. 7, the first frames 700 may carry eMBMS services on the PMCH 520. For example, the first base station 502 may broadcast the frames 700, which carry the PMCH 520. In the illustrated aspect, the PMCH 520 may be carried on subframes 3 and 7 of the first frames 700. However, not all instances of the PMCH 520 may carry eMBMS data intended for the UE 504. In the illustrated aspect, the first subframes 702a, 702b include the PMCH 520 that carries eMBMS services intended for the UE 504, whereas the next two subframes 702c, 702d of the PMCH do not carry eMBMS data intended for the UE 504.

The second base station 506 may broadcast the second frames 720. The second frames 720 include the PCH 522. Each slot 722a, 722b, 722c, 722d includes the PCH 522 that carries a repetition of paging data from the second base station 506. In aspects, the UE 504 may determine 540 that paging data carried on the PCH 522 is decodable from a subset of the slots 722a, 722b, 722c, 722d. For example, the UE 504 may determine 540 that the paging data is decodable from two of the slots 722a, 722b, 722c, 722d.

The UE 504 may be configured to determine that PMCH 520 is scheduled such that the subframes 702a, 702b, 702c, 702d including the PMCH 520 collide with slots 722a, 722b, 722c, 722d including the PCH 522. The collisions 740 of the PMCH 520 with the PCH 522 may prevent the UE 504 from simultaneously decoding data in both a subframe 702 and a slot 722. However, the UE 504 may not need to decode the PMCH 520 at subframes 702c, 702d because those subframes 702c, 702d do not carry eMBMS data intended for the UE 504. Further, because the UE 504 may determine 540 that the paging data is decodable from a subset of the slots 722a, 722b, 722c, 722d, the UE 504 may be configured to decode 542 both the eMBMS data and the paging data.

At the first collisions 740a, 740b, the UE 504 may prioritize eMBMS data over the paging data. Accordingly, the UE 504 may decode 542 the eMBMS data carried on the PMCH 520 at the subframes 702a, 702b of the first frames 700. At the second collisions 740c, 740d, the UE 504 may prioritize paging data over the eMBMS data. Accordingly, the UE 504 may decode 542 the paging data carried on the PCH 522 at the slots 722c, 722d of the second frames 720. Thus, the UE 504 may acquire both the paging data and the eMBMS data intended for the UE 504 by opportunistically decoding data from the PMCH 520 and then the PCH 522.

Figure 8:
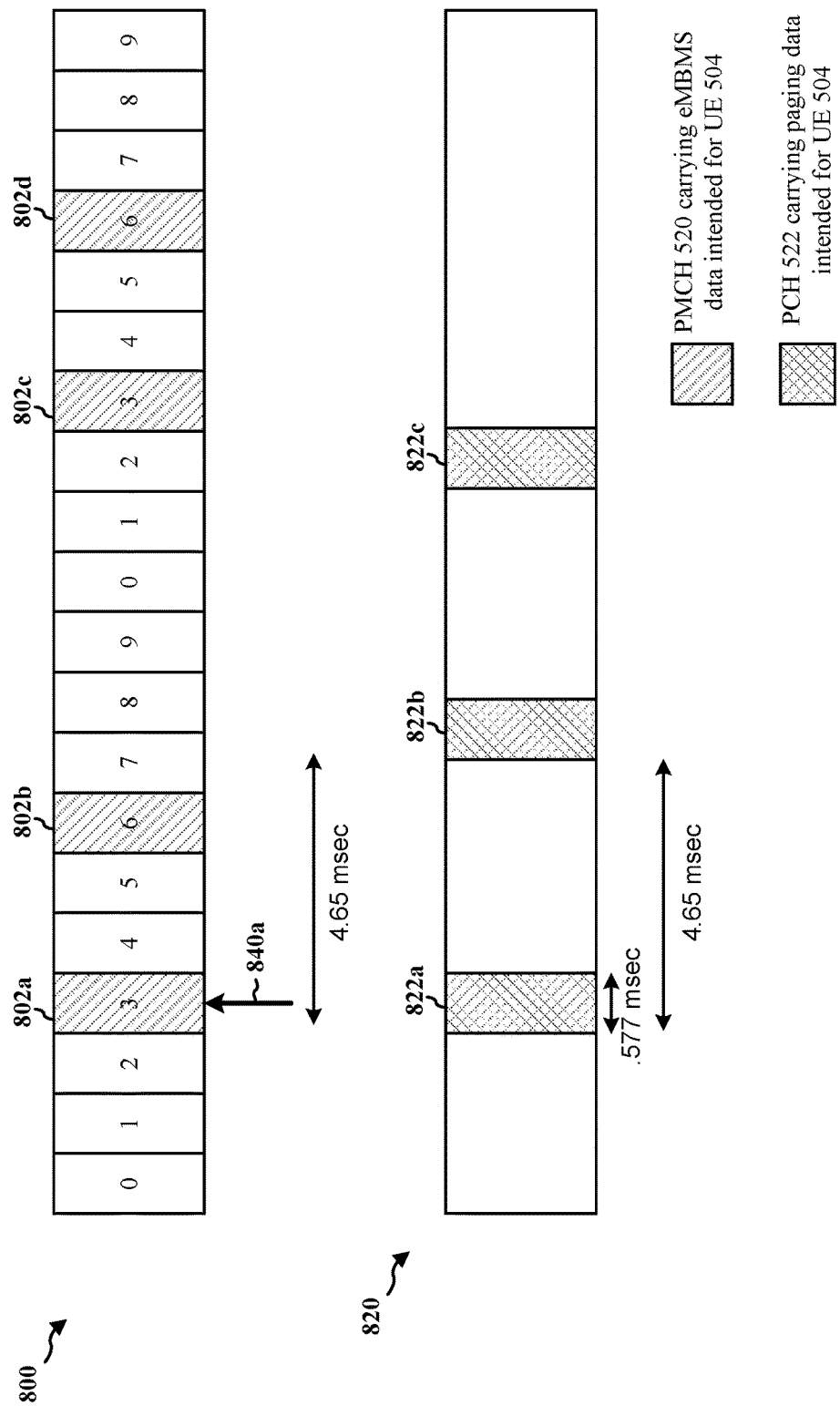
FIG. 8 is a diagram of frames in a wireless communications system.

Turning to FIG. 8, the first frames 800 may carry eMBMS services on the PMCH 520. For example, the first base station 502 may broadcast the frames 800, which carry the PMCH 520. In the illustrated aspect, the PMCH 520 may be carried on subframes 3 and 6 of the first frames 800. In the illustrated aspect, the subframes 802a, 802b, 802c, 802d include the PMCH 520 that carries eMBMS services intended for the UE 504.

The second base station 506 may broadcast the second frames 820. The second frames 820 include the PCH 522. Each slot 822a, 822b, 822c includes the PCH 522 that carries a repetition of paging data from the second base station 506. In aspects, the UE 504 may determine 540 that paging data carried on the PCH 522 is decodable from a subset of the slots 822a, 822b, 822c. For example, the UE 504 may determine 540 that the paging data is decodable from two of the slots 822a, 822b, 822c.

The UE 504 may be configured to determine that the PMCH 520 is scheduled such that one subframe 802a that includes the PMCH 520 collides with one slot 822a that includes the PCH 522. Because the first frames 800 from the first base station 502 may have a different duration than the second frames 820 from the second base station 506, the collision 840a between the first subframe 802a and the first slot 822a is not necessarily experienced between other subframes 802b, 802c, 802d and slots 822b, 822c.

At the first collision 840a, the UE 504 may prioritize eMBMS data over the paging data, for example, when the UE 504 determines 540 that the paging data is decodable from a subset of the slots 822a, 822b, 822c. The UE 504 may decode 542 the eMBMS data carried on the PMCH 520 at the subframe 802a of the first frames 800 at the collision 840a. Because there are no remaining collisions, the UE 504 may decode 542 the paging data carried on the PCH 522 at the slots 822b, 822c of the second frames 820. Further, the UE 504 may decode 542 the eMBMS data carried on the PMCH 520 included in the remaining subframes 802b, 802c, 802d. Thus, the UE 504 may acquire both the paging data and the eMBMS data intended for the UE 504 by opportunistically decoding data from the PMCH 520 and then the PCH 522.

Figure 9:
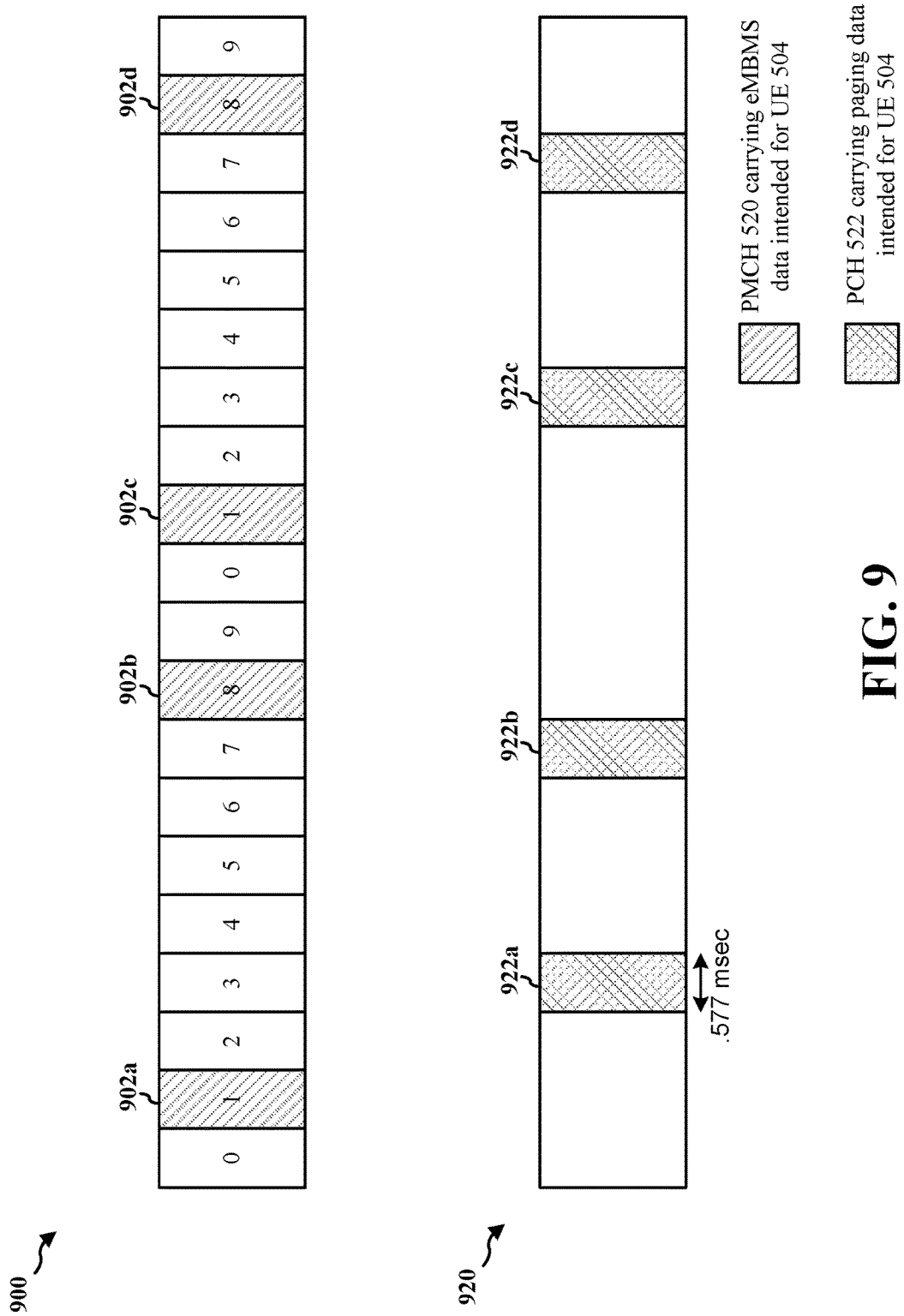
FIG. 9 is a diagram of frames in a wireless communications system.

With respect to FIG. 9, the first frames 900 may carry eMBMS services on the PMCH 520. For example, the first base station 502 may broadcast the frames 900, which carry the PMCH 520. In the illustrated aspect, the PMCH 520 may be carried on subframes 1 and 8 of the first frames 900. In the illustrated aspect, the subframes 902a, 902b, 902c, 902d include the PMCH 520 that carries eMBMS services intended for the UE 504.

The second base station 506 may broadcast the second frames 920. The second frames 920 include the PCH 522. Each slot 922a, 922b, 922c, 922d includes the PCH 522 that carries a repetition of paging data from the second base station 506.

In the illustrated aspect, the UE 504 may be configured to determine that PMCH 520 is scheduled such that subframes 902a, 902b, 902c, 902d that include the PMCH 520 do not collide with slots 922a, 922b, 922c, 922d that include the PCH 522. Therefore, the UE 504 may decode 542 both eMBMS data and paging data, for example, during a single paging occasion.

Accordingly, the UE 504 may decode 542 the eMBMS data carried on the PMCH 520 at the subframes 902a, 902b, 902c, 902d of the first frames 900. Further, the UE 504 may decode 542 the paging data carried on the PCH 522 from one or more slots 922a, 922b, 922c, 922d of the second frames 920. Thus, the UE 504 may acquire both the paging data and the eMBMS data intended for the UE 504 by opportunistically decoding data from the PMCH 520 and then the PCH 522.

Figure 10:
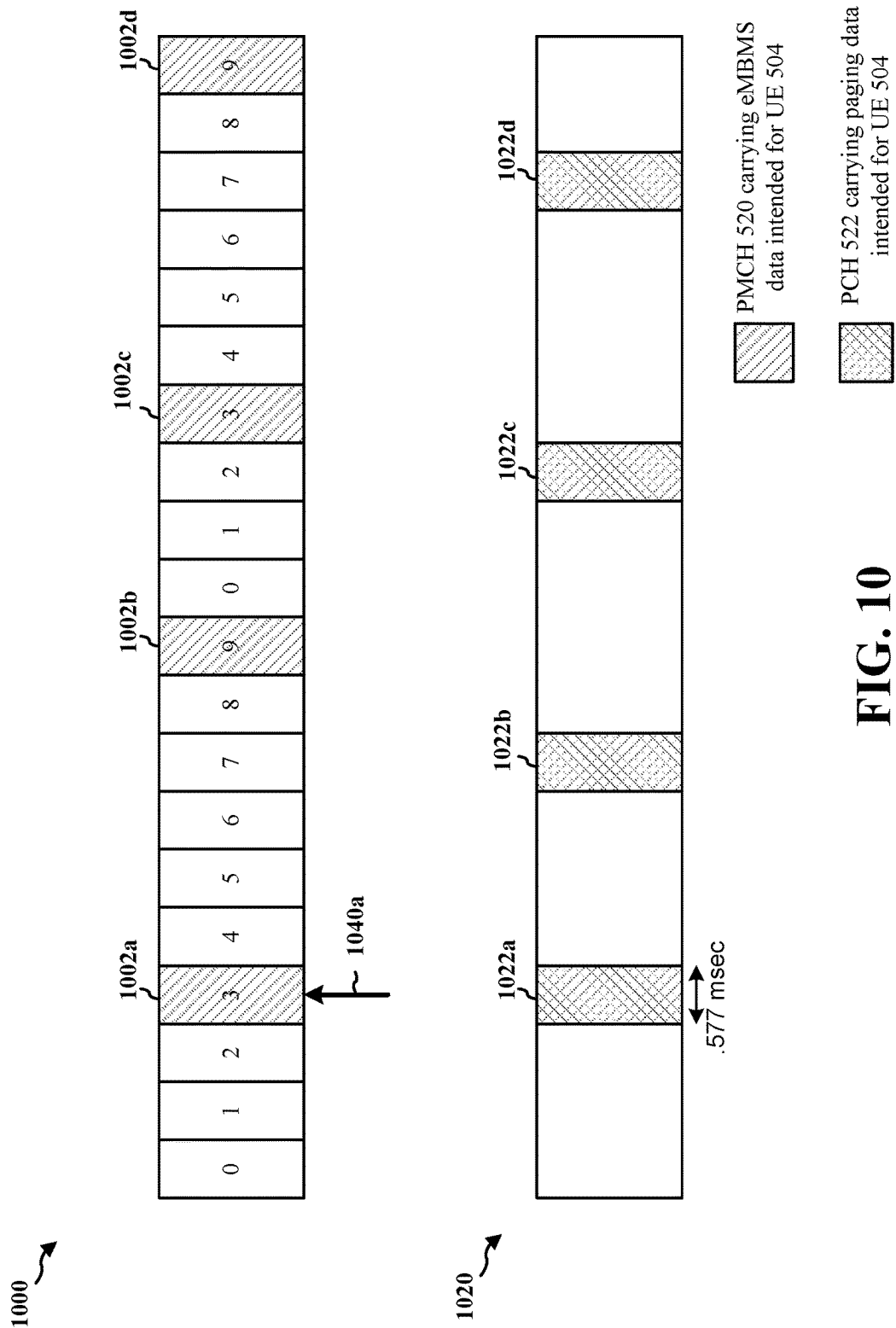
FIG. 10 is a diagram of frames in a wireless communications system.

Turning to FIG. 10, the first frames 1000 may carry eMBMS services on the PMCH 520. For example, the first base station 502 may broadcast the frames 1000, which carry the PMCH 520. In the illustrated aspect, the PMCH 520 may be carried on subframes 3 and 9 of the first frames 1000, which may correspond to uplink-downlink configuration 2 in a TDD system. In the illustrated aspect, the subframes 1002a, 1002b, 1002c, 1002d include the PMCH 520 that carries eMBMS services intended for the UE 504.

The second base station 506 may broadcast the second frames 1020. The second frames 1020 include the PCH 522. Each slot 1022a, 1022b, 1022c, 1022d includes the PCH 522 that carries a repetition of paging data from the second base station 506. In aspects, the UE 504 may determine 540 that paging data carried on the PCH 522 is decodable from a subset of the slots 1022a, 1022b, 1022c, 1022d. For example, the UE 504 may determine 540 that the paging data is decodable from two of the slots 1022a, 1022b, 1022c, 1022d.

The UE 504 may be configured to determine that PMCH 520 is scheduled such that one subframe 1002a that includes the PMCH 520 collides with one slot 1022a that includes the PCH 522. Because the first frames 1000 from the first base station 502 may have a different duration than the second frames 1020 from the second base station 506, the collision 1040a between the first subframe 1002a and the first slot 1022a is not necessarily experienced between other subframes 1002b, 1002c, 1002d and slots 1022b, 1022c, 1022d.

At the first collision 1040a, the UE 504 may prioritize eMBMS data over the paging data, for example, when the UE 504 determines 540 that the paging data is decodable from a subset of the slots 1022a, 1022b, 1022c, 1022d. The UE 504 may decode 542 the eMBMS data carried on the PMCH 520 at the subframe 1002a of the first frames 1000 at the collision 1040a. Because there are no remaining collisions, the UE 504 may decode 542 the paging data carried on the PCH 522 at the slots 1022b, 1022c, 1022d of the second frames 1020. Further, the UE 504 may decode 542 the eMBMS data carried on the PMCH 520 included in the remaining subframes 1002b, 1002c, 1002d. Thus, the UE 504 may acquire both the paging data and the eMBMS data intended for the UE 504 by opportunistically decoding data from the PMCH 520 and then the PCH 522.

Figure 11:
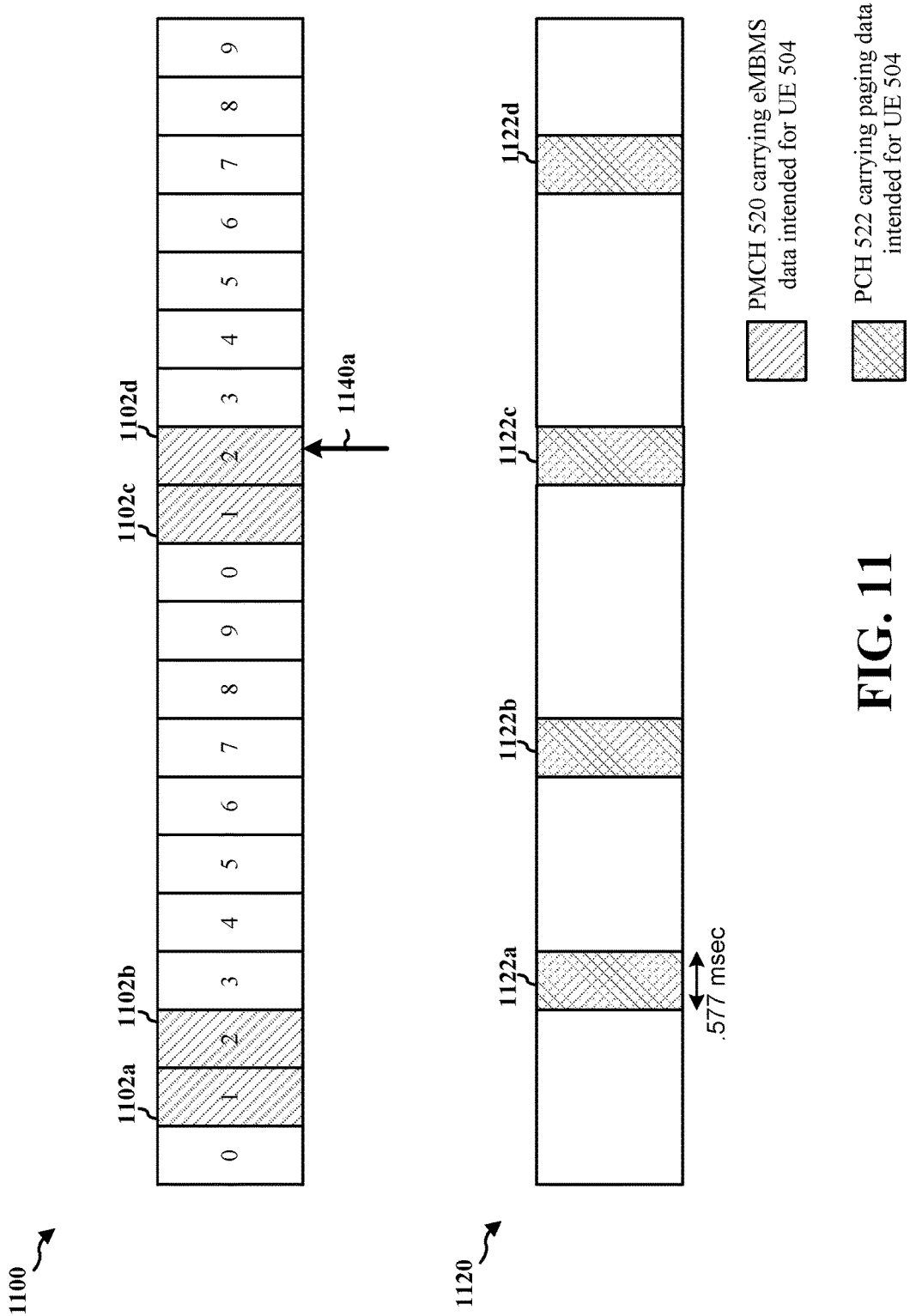
FIG. 11 is a diagram of frames in a wireless communications system.

Referring to FIG. 11, the first frames 1100 may carry eMBMS services on the PMCH 520. For example, the first base station 502 may broadcast the frames 1100, which carry the PMCH 520. In the illustrated aspect, the PMCH 520 may be carried on subframes 1 and 2 of the first frames 1100, which may correspond to an FDD system. In the illustrated aspect, the subframes 1102a, 1102b, 1102c, 1102d include the PMCH 520 that carries eMBMS services intended for the UE 504.

The second base station 506 may broadcast the second frames 1120. The second frames 1120 include the PCH 522. Each slot 1122a, 1122b, 1122c, 1122d includes the PCH 522 that carries a repetition of paging data from the second base station 506. In aspects, the UE 504 may determine 540 that paging data carried on the PCH 522 is decodable from a subset of the slots 1122a, 1122b, 1122c, 1122d. For example, the UE 504 may determine 540 that the paging data is decodable from two of the slots 1122a, 1122b, 1122c, 1122d.

The UE 504 may be configured to determine that PMCH 520 is scheduled such that one subframe 1102d that includes the PMCH 520 collides with one slot 1122c that includes the PCH 522. Because the first frames 1100 from the first base station 502 may have a different duration than the second frames 820 from the second base station 506, the collision 1140a between the fourth subframe 1102d and the third slot 1122c is not necessarily experienced between other subframes 1102a, 1102b, 1102c and slots 1122a, 1122b, 1122d.

The UE 504 may decode 542 the paging data carried on the PCH 522 at the slots 1122a, 1122b of the second frames 1120. Further, the UE 504 may decode 542 the eMBMS data carried on the PMCH 520 included in the subframes 1102a, 1102b, 1102c. At the collision 1140a, the UE 504 may prioritize eMBMS data over the paging data, for example, when the UE 504 determines 540 that the paging data is decodable from a subset of the slots 1122a, 1122b, 1122d. The UE 504 may decode 542 the eMBMS data carried on the PMCH 520 at the subframe 1102d of the first frames 1100 at the collision 1140a. The UE 504 may decode 542 the paging data carried on the PCH 522 at the slot 1122d if necessary. Thus, the UE 504 may acquire both the paging data and the eMBMS data intended for the UE 504 by opportunistically decoding data from the PMCH 520 and then the PCH 522.

Figure 12:
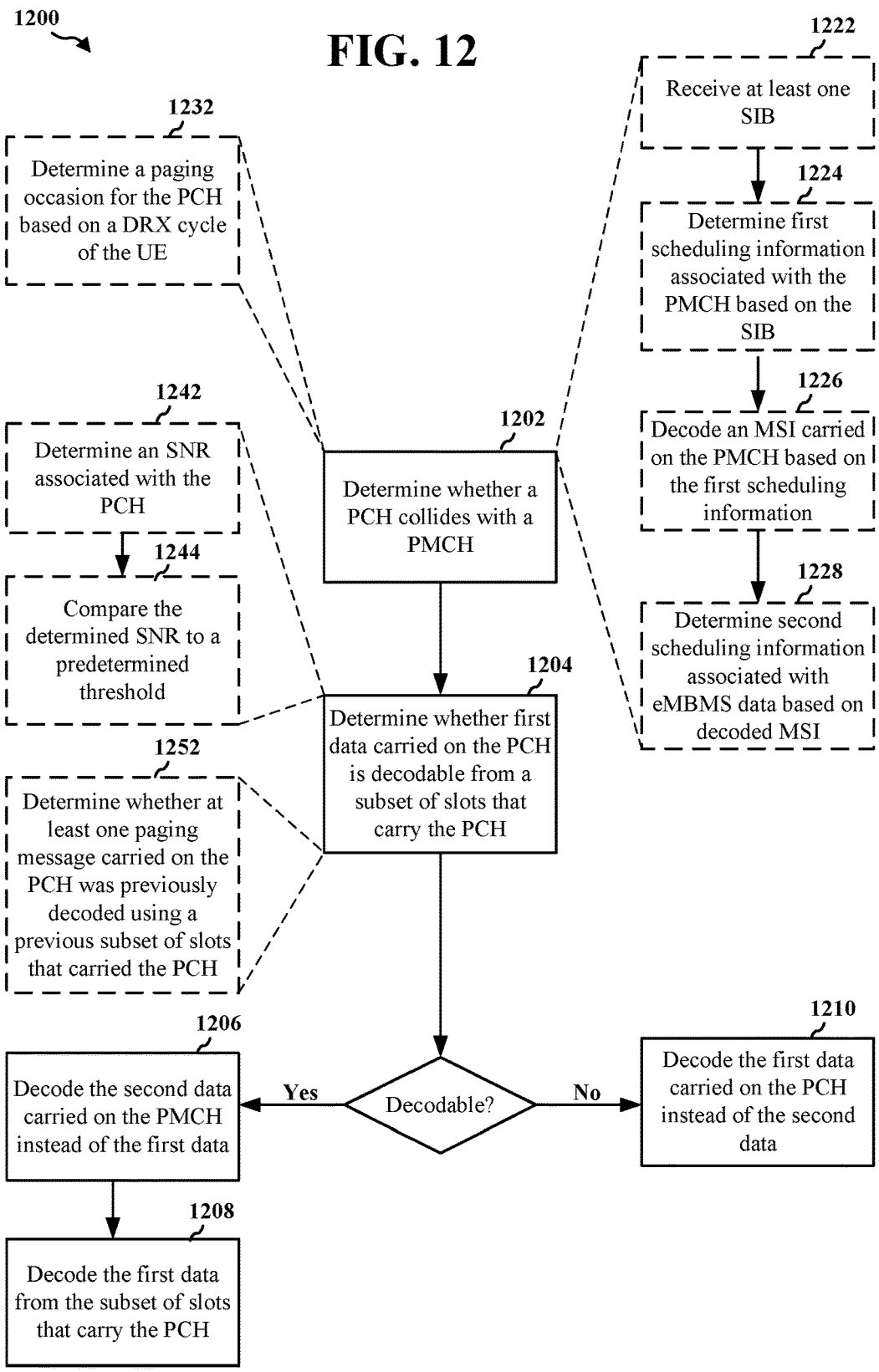
FIG. 12 is a flowchart of a method of wireless communication.

FIG. 12 is a flowchart of a method 1200 of wireless communication. The method may be performed by a UE (e.g., the UE 504, the apparatus 1302/1302'). Although FIG. 12 illustrates a plurality of operations, one of ordinary skill will appreciate that one or more operations may be transposed and/or contemporaneously performed. Further, one or more operations of FIG. 12 may be optional (e.g., as denoted by dashed lines) and/or performed in connection with one or more other operations.

Beginning first with operation 1202, the UE may determine whether a PCH collides with a PMCH. For example, the UE may determine whether a first slot of a set of slots that carry the PCH at least partially overlaps with a first subframe that carries the PMCH. In the context of FIG. 5, the UE 504 may determine whether the PMCH 520, received from the first base station 502, collides with the PCH 522, received from the second base station 506.

In one aspect, operation 1202 may include operation 1232. At operation 1232, the UE may determine a paging occasion for the PCH based on a DRX cycle of the UE. For example, a base station may configure DRX cycles at the UE, and the DRX cycles may define when the UE is awake to receive the PCH (e.g., a paging occasion). In the context of FIG. 5, the UE 504 may determine paging occasions associated with the PCH 522 based on DRX cycles of the UE 504 that may be configured by the second base station 506.

In one aspect, operation 1202 may include operations 1222, 1224, 1226, 1228. At operation 1222, the UE may receive at least one SIB. In the context of FIG. 5, the UE may receive the at least one SIB from the first base station 502.

At operation 1224, the UE may determine first scheduling information associated with the PMCH based on the SIB. In one aspect, the first scheduling information may include scheduling information for an MSI. In the context of FIG. 5, the UE 504 may determine scheduling information for the MSI of the PMCH 520.

In one aspect of operation 1202, the UE may determine, based on the first scheduling information, whether the MSI collides with a paging occasion associated with the PCH.

At operation 1226, the UE may decode the MSI based on the first scheduling information. In the context of FIG. 5, the UE 504 may decode the MSI of the PMCH 520 based on scheduling information received from the first base station 502.

At operation 1228, the UE may determine second scheduling information associated with eMBMS data based on the decoded MSI. In the context of FIG. 5, the UE 504 may determine scheduling information for eMBMS services carried on the PMCH 520.

In one aspect of operation 1202, the UE may determine, based on the second scheduling information, whether the eMBMS data collides with a paging occasion associated with the PCH.

At operation 1204, the UE may determine whether first data carried on the PCH is decodable from a subset of slots that carry the PCH. In the context of FIG. 5, the UE 504 may determine 540 whether paging data carried on the PCH 522 is decodable from a subset of slots that carry the PCH 522.

In one aspect, operation 1204 includes operations 1242, 1244. At operation 1242, the UE may determine an SNR associated with the PCH. In the context of FIG. 5, the UE 504 may determine an SNR associated with the PCH 522.

At operation 1244, the UE may compare the determined SNR to a predetermined threshold. In the context of FIG. 5, the UE 504 may compare the determined SNR to a predetermined threshold in order to determine 540 whether the paging data carried on the PCH 522 is decodable from a subset of slots that carry the PCH 522.

In one aspect, operation 1204 includes operation 1252. At operation 1252, the UE may determine whether at least one paging message carried on the PCH was previously decoded using a previous subset of slots that carry the PCH. For example, the UE may observe that paging messages are decodable from a subset of slots that include paging data and, therefore, the UE may anticipate that future paging messages will be decodable from a subset of slots that include paging data. In the context of FIG. 5, the UE 504 may determine whether at least one paging message carried on the PCH 522 was previously decoded using a previous subset of slots that carry the PCH 522.

If the UE determines that the first data carried on the PCH is decodable from a subset of slots that carry the PCH, the method 1200 may proceed to operations 1206, 1208.

At operation 1206, the UE may decode second data carried on the PMCH instead of the first data. In other words, when the PMCH collides with the PCH, the UE may decode the data (e.g., eMBMS data) carried on the PMCH instead of the data (e.g., paging data) carried on the PCH. In the context of FIG. 5, the UE 504 may decode 542 the eMBMS data carried on the PMCH 520 instead of the PCH 522 when the PMCH 520 collides with the PCH 522.

At operation 1208, the UE may decode the first data from the subset of slots that carry the PCH. In other words, the UE may decode the data (e.g., paging data) carried on the PCH at slots that do not overlap with subframes that carry the PMCH for the UE. In the context of FIG. 5, the UE 504 may decode 542 the paging data carried on the PCH 522.

If the UE determines that the first data carried on the PCH is not decodable from a subset of slots that carry the PCH, the method 1200 may proceed to operation 1210.

At operation 1210, the UE may decode the first data carried on the PCH instead of the second data carried on the PMCH. In other words, when the PMCH collides with the PCH, the UE may decode the data (e.g., paging data) carried on the PCH instead of the data (e.g., eMBMS data) carried on the PMCH. However, the UE may still attempt to decode data carried on the PMCH, for example, at subframes that do not overlap with slots of the PCH carrying paging data for the UE. In the context of FIG. 5, the UE 504 may decode 542 the paging data carried on the PCH 522 instead of the PMCH 520 when the PMCH 520 collides with the PCH 522.

Figure 13:
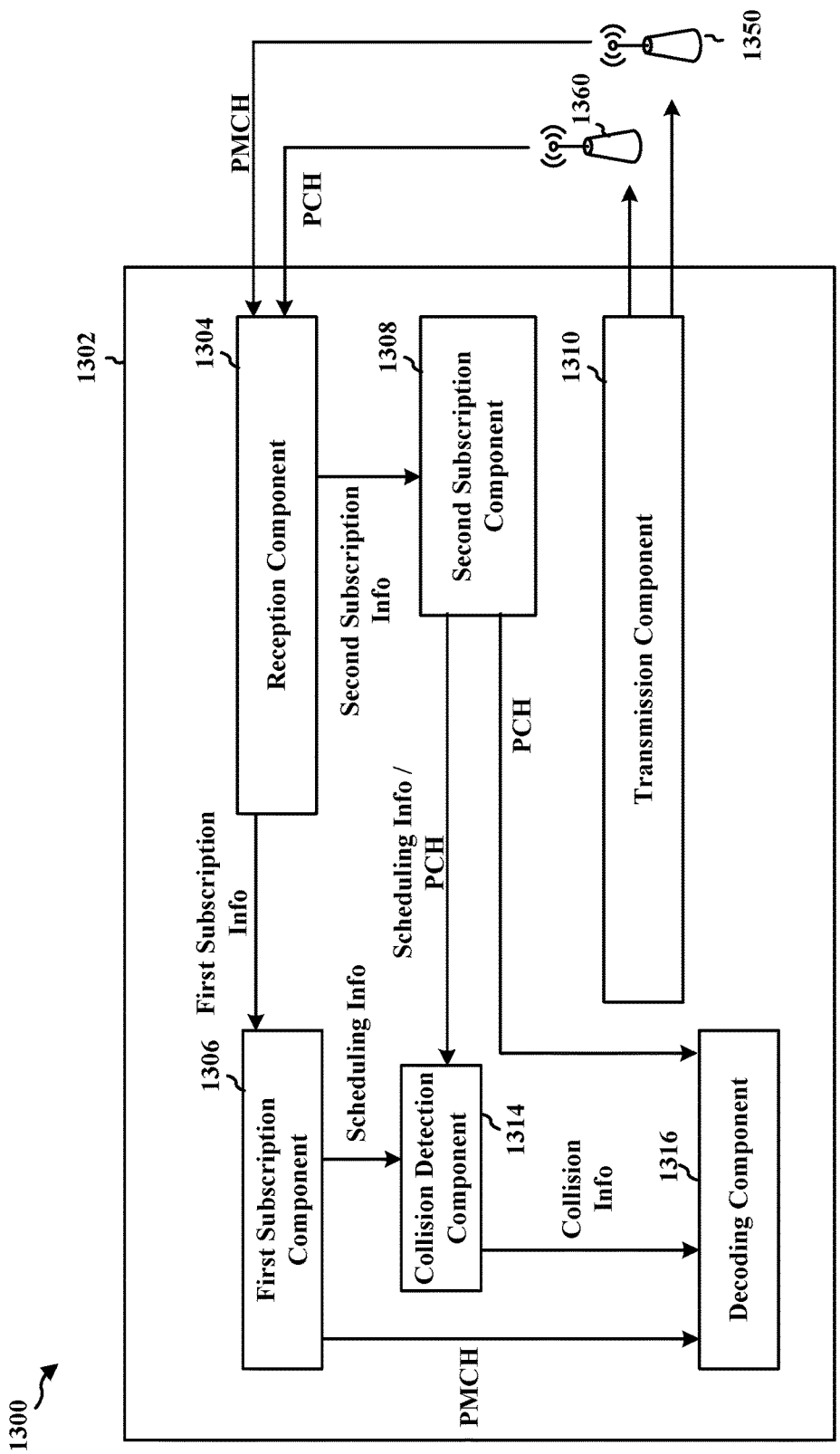
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE. The apparatus 1302 may include a reception component 1304 configured to receive data from a first base station 1350 and a second base station 1360. The apparatus 1302 may include a transmission component 1310 configured to transmit data to a first base station 1350 and a second base station 1360.

The apparatus 1302 may include a first subscription component 1306 configured for communication with a first RAN that includes the first base station 1350. The first subscription component 1306 may include a first SIM for communication with the first RAN. In an aspect, the first subscription component 1306 may receive, from the first base station 1350, a PMCH.

The apparatus 1302 may include a second subscription component 1308 configured for communication with a second RAN that includes the second base station 1360. The second subscription component 1308 may include a second SIM for communication with the second RAN. In an aspect, the second subscription component 1308 may receive, from the second base station 1360, a PCH.

The first subscription component 1306 may determine scheduling information associated with the PMCH. In an aspect, the first subscription component 1306 may receive, from the first base station 1350, at least one SIB. The first subscription component 1306 may be configured to determine first scheduling information associated with an MSI based on the SIB. In an aspect, the first subscription component 1306 may be configured to decode an MSI carried on the PMCH based on the first scheduling information. The first subscription component 1306 may determine second scheduling information associated with eMBMS data based on the decoded MSI. The first subscription component 1306 may provide scheduling information associated with the PMCH to a collision detection component 1314.

The second subscription component 1308 may determine scheduling information associated with the PCH. In an aspect, the second subscription component 1308 may receive, from the second base station 1360, at least one SIB. The second subscription component 1308 may be configured to determine DRX cycles associated with the second base station 1360, for example, so that the apparatus 1302 is awake during paging occasions to receive paging messages from the second base station 1360. The second subscription component 1308 may provide scheduling information (e.g., paging occasions) associated with the PCH to the collision detection component 1314.

The collision detection component 1314 may be configured to determine whether the PCH collides with the PMCH. In an aspect, the collision detection component 1314 may determine that the PCH collides with the PMCH by determining that a first slot of a set of slots that carry the PCH (e.g., a set of slots during a paging occasion) at least partially overlaps with a first subframe that carries the PMCH.

In an aspect, the collision detection component 1314 may be configured to determine whether the first data carried on the PCH is decodable from a subset of slots that carry the PCH, wherein the subset of slots is included in a set of slots that carry the PCH (e.g., the first slot of four consecutive paging frames). In one aspect, the collision detection component 1314 may determine whether the first data carried on the PCH is decodable from the subset of slots by determining an SNR associated with the PCH and comparing the determined SNR to a predetermined threshold. Based on the comparison, the collision detection component 1314 may be configured to determine whether the first data carried on the PCH is decodable from a subset of slots.

In another aspect, the collision detection component 1314 may be configured to determine whether first data carried on the PCH is decodable from the subset of slots based on historical data. For example, the collision detection component 1314 may observe that a previous paging message was obtained by decoding data from two or three slots and, therefore, the collision detection component 1314 may determine that a next paging message may be obtained by decoding data from two or three slots The collision detection component 1314 may provide, to a decoding component 1316, an indication of whether the first data carried on the PCH is decodable from a subset of slots that carry the PCH when the PCH collides with the PMCH.

The decoding component 1316 may be configured to decode data carried on the PMCH received through the first subscription component 1306. Additionally, the decoding component 1316 may be configured to decode data carried on the PCH received through the second subscription component 1308.

When the first data is decodable from the subset of slots and the PMCH collides with the PCH, the decoding component 1316 may decode second data carried on the PMCH instead of the first data, for example, at one or more slots of the PCH that overlap with one or more subframes of the PMCH. The decoding component 1316 may be configured to decode the first data from the subset of slots, for example, at one or more slots of the PCH that do not overlap with one or more subframes of the PMCH.

When the first data is not decodable from the subset of slots and the PMCH collides with the PCH, the decoding component 1316 may decode the first data carried on the PCH instead of the second data carried on the PMCH, for example, at one or more slots of the PCH that overlap with one or more subframes of the PMCH. The decoding component 1316 may be attempt to opportunistically decode the second data, for example, at one or more subframes of the PMCH that do not overlap with one or more slots of the PCH.

The apparatus may include additional components that perform each of the blocks of the algorithm in the aforementioned flowcharts of FIG. 12. As such, each block in the aforementioned flowcharts of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
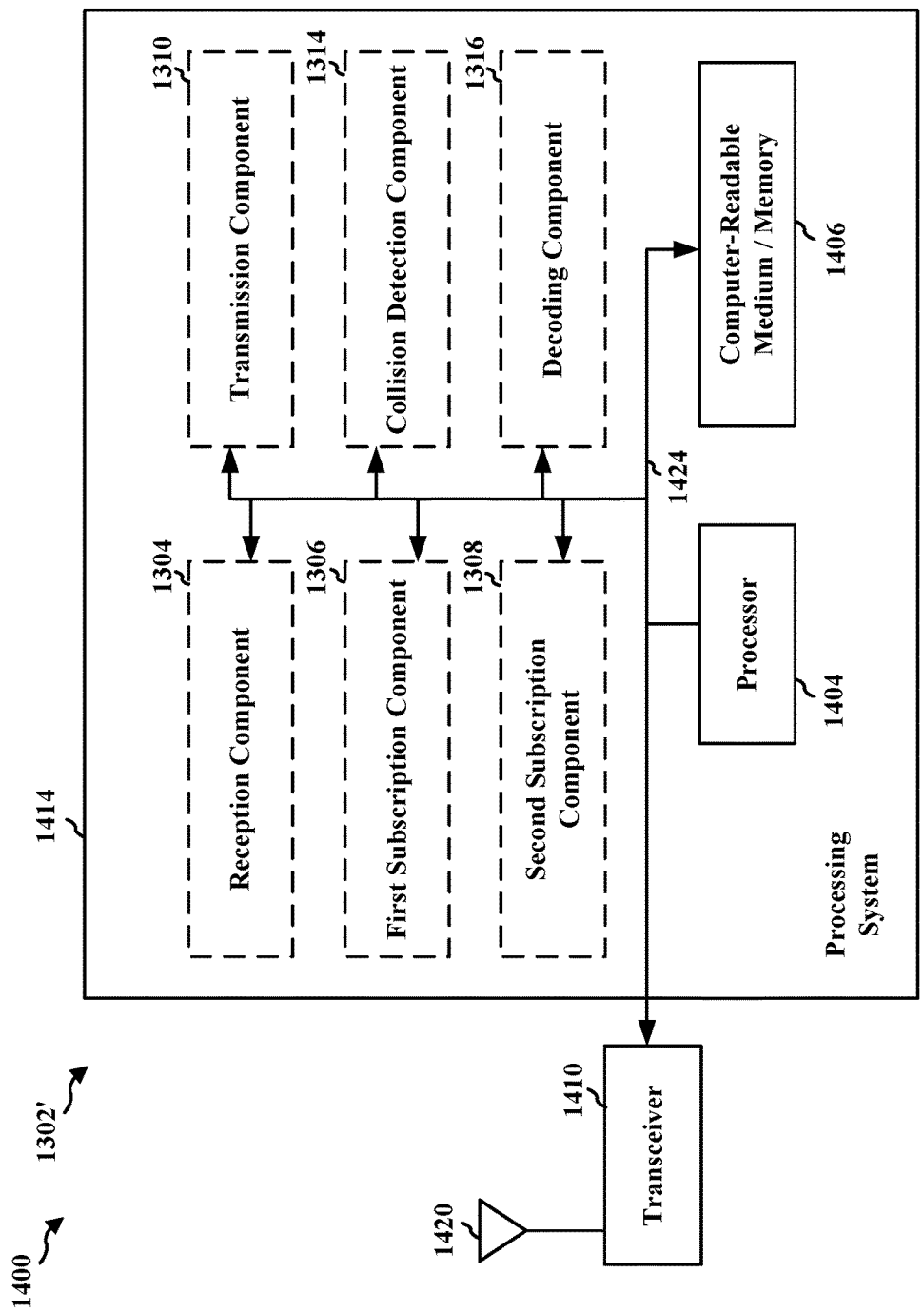
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1314, 1316 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1314, 1316. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for determining whether first data carried on a PCH is decodable from a subset of slots that carry the PCH, the subset of slots included in a set of slots that carry the PCH. The apparatus 1302/1302' may further include means for decoding data, wherein, when the PCH collides with a physical multicast channel (PMCH), the means for decoding data is configured for decoding second data carried on the PMCH instead of the first data when the first data is determined to be decodable from the subset of slots that carry the PCH, and decoding the first data instead of the second data when the first data is not determined to be decodable from the subset of slots that carry the PCH.

In an aspect, when the PCH collides with the PMCH, the means for decoding data is further configured for decoding the first data from the subset of slots that carry the PCH when the first data is determined to be decodable from the subset of slots that carry the PCH.

In an aspect, the first data includes a paging message intended for the apparatus 1302/1302' and the second data includes one of MSI or eMBMS data intended for the apparatus 1302/1302'.

In an aspect, the apparatus 1302/1302' further includes means for determining whether the PCH collides with the PMCH.

In an aspect, the means for determining whether the PCH collides with the PMCH is configured for determining that a first slot of the set of slots that carry the PCH at least partially overlaps with a first subframe that carries the PMCH.

In an aspect, the means for determining whether the PCH collides with the PMCH is configured for receiving at least one SIB, and determining first scheduling information associated with the second data based on the SIB.

In an aspect, the means for determining whether the PCH collides with the PMCH is further configured for decoding MSI carried on the PMCH based on the first scheduling information, and determining second scheduling information associated with eMBMS data based on the decoded MSI.

In an aspect, the means for determining whether the PCH collides with the PMCH is configured for determining a paging occasion for the PCH based on a DRX cycle of the apparatus 1302/1302'.

In an aspect, the means for determining whether the first data carried on the PCH is decodable from the subset of slots of that carry the PCH is configured for determining a signal-to-noise ratio (SNR) associated with the PCH, and comparing the determined SNR to a predetermined threshold.

In an aspect, the means for determining whether the first data carried on the PCH is decodable from the subset of slots of that carry the PCH is configured for determining whether at least one paging message carried on the PCH was previously decoded using a previous subset of slots that carried the PCH, the previous subset of slots included in a previous set of slots that carried the PCH.

In an aspect, the first data carried on the PCH is repeated in a respective first slot of four consecutive frames.

In an aspect, the apparatus 1302/1302' includes at least a first subscriber identity module (SIM) for receiving the PCH from a first network and a second SIM for receiving the PMCH from a second network.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), the method comprising:
    determining whether first data carried on a paging channel (PCH) is decodable from a subset of slots that carry the PCH, the subset of slots included in a set of slots that carry the PCH; and
    when the PCH collides with a physical multicast channel (PMCH):
        decoding second data carried on the PMCH instead of the first data when the first data is determined to be decodable from the subset of slots that carry the PCH; and
        decoding the first data instead of the second data when the first data is not determined to be decodable from the subset of slots that carry the PCH.

2. The method of claim 1, further comprising, when the PCH collides with the PMCH:
    decoding the first data from the subset of slots that carry the PCH when the first data is determined to be decodable from the subset of slots that carry the PCH.

3. The method of claim 1, wherein the first data includes a paging message intended for the UE and wherein the second data includes one of multicast channel scheduling information (MSI) or evolved multimedia multicast and broadcast services (eMBMS) data intended for the UE.

4. The method of claim 1, further comprising:
    determining whether the PCH collides with the PMCH.

5. The method of claim 4, wherein the determination of whether the PCH collides with the PMCH comprises:

determining that a first slot of the set of slots that carry the PCH at least partially overlaps with a first subframe that carries the PMCH.

6. The method of claim 4, wherein the determination of whether the PCH collides with the PMCH comprises:
receiving at least one system information block (SIB); and
determining first scheduling information associated with the second data based on the SIB.

7. The method of claim 6, wherein the determination of whether the PCH collides with the PMCH further comprises:
decoding multicast channel scheduling information (MSI) carried on the PMCH based on the first scheduling information; and
determining second scheduling information associated with evolved multimedia multicast and broadcast services (eMBMS) data based on the decoded MSI.

8. The method of claim 4, wherein the determination of whether the PCH collides with the PMCH comprises:
determining a paging occasion for the PCH based on a discontinuous reception (DRX) cycle of the UE.

9. The method of claim 1, wherein the determination of whether the first data carried on the PCH is decodable from the subset of slots of that carry the PCH comprises:
determining a signal-to-noise ratio (SNR) associated with the PCH; and
comparing the determined SNR to a predetermined threshold.

10. The method of claim 1, wherein the determination of whether the first data carried on the PCH is decodable from the subset of slots of that carry the PCH comprises:
determining whether at least one paging message carried on the PCH was previously decoded using a previous subset of slots that carried the PCH, the previous subset of slots included in a previous set of slots that carried the PCH.

11. The method of claim 1, wherein the first data carried on the PCH is repeated in a respective first slot of four consecutive frames.

12. The method of claim 1, wherein the UE includes at least a first subscriber identity module (SIM) for receiving the PCH from a first network and a second SIM for receiving the PMCH from a second network.

13. A user equipment (UE), the UE comprising:
means for determining whether first data carried on a paging channel (PCH) is decodable from a subset of slots that carry the PCH, the subset of slots included in a set of slots that carry the PCH; and
means for decoding data, wherein, when the PCH collides with a physical multicast channel (PMCH), the means for decoding data is configured for:
decoding second data carried on the PMCH instead of the first data when the first data is determined to be decodable from the subset of slots that carry the PCH; and
decoding the first data instead of the second data when the first data is not determined to be decodable from the subset of slots that carry the PCH.

14. The UE of claim 13, wherein, when the PCH collides with the PMCH, the means for decoding data is further configured for decoding the first data from the subset of slots that carry the PCH when the first data is determined to be decodable from the subset of slots that carry the PCH.

15. The UE of claim 13, wherein the first data includes a paging message intended for the UE and wherein the second data includes one of multicast channel scheduling information (MSI) or evolved multimedia multicast and broadcast services (eMBMS) data intended for the UE.

16. The UE of claim 13, further comprising:
means for determining whether the PCH collides with the PMCH.

17. The UE of claim 16, wherein the means for determining whether the PCH collides with the PMCH is configured for determining that a first slot of the set of slots that carry the PCH at least partially overlaps with a first subframe that carries the PMCH.

18. The UE of claim 16, wherein the means for determining whether the PCH collides with the PMCH is configured for:
receiving at least one system information block (SIB); and
determining first scheduling information associated with the second data based on the SIB.

19. The UE of claim 18, wherein the means for determining whether the PCH collides with the PMCH is further configured for:
decoding multicast channel scheduling information (MSI) carried on the PMCH based on the first scheduling information; and
determining second scheduling information associated with evolved multimedia multicast and broadcast services (eMBMS) data based on the decoded MSI.

20. The UE of claim 16, wherein the means for determining whether the PCH collides with the PMCH is configured for determining a paging occasion for the PCH based on a discontinuous reception (DRX) cycle of the UE.

21. The UE of claim 13, wherein the means for determining whether the first data carried on the PCH is decodable from the subset of slots of that carry the PCH is configured for:
determining a signal-to-noise ratio (SNR) associated with the PCH; and
comparing the determined SNR to a predetermined threshold.

22. The UE of claim 13, wherein the means for determining whether the first data carried on the PCH is decodable from the subset of slots of that carry the PCH is configured for determining whether at least one paging message carried on the PCH was previously decoded using a previous subset of slots that carried the PCH, the previous subset of slots included in a previous set of slots that carried the PCH.

23. The UE of claim 13, wherein the first data carried on the PCH is repeated in a respective first slot of four consecutive frames.

24. The UE of claim 13, wherein the UE includes at least a first subscriber identity module (SIM) for receiving the PCH from a first network and a second SIM for receiving the PMCH from a second network.

25. A user equipment (UE), the UE comprising:
a memory; and
at least one processor coupled to the memory and configured to:
determine whether first data carried on a paging channel (PCH) is decodable from a subset of slots that carry the PCH, the subset of slots included in a set of slots that carry the PCH; and
when the PCH collides with a physical multicast channel (PMCH):
decode second data carried on the PMCH instead of the first data when the first data is determined to be decodable from the subset of slots that carry the PCH; and
decode the first data instead of the second data when the first data is not determined to be decodable from the subset of slots that carry the PCH.

26. The UE of claim 25, wherein, when the PCH collides with the PMCH, the at least one processor is further configured to:
  decode the first data from the subset of slots that carry the PCH when the first data is determined to be decodable from the subset of slots that carry the PCH.

27. The UE of claim 25, wherein the first data includes a paging message intended for the UE and wherein the second data includes one of multicast channel scheduling information (MSI) or evolved multimedia multicast and broadcast services (eMBMS) data intended for the UE.

28. The UE of claim 25, wherein the at least one processor is further configured to determine whether the PCH collides with the PMCH.

29. The UE of claim 28, wherein the at least one processor is configured to determine whether the PCH collides with the PMCH by determining that a first slot of the set of slots that carry the PCH at least partially overlaps with a first subframe that carries the PMCH.

30. A non-transitory, computer-readable medium storing computer-executable code for wireless communication by a user equipment (UE), comprising code to:
  determine whether first data carried on a paging channel (PCH) is decodable from a subset of slots that carry the PCH, the subset of slots included in a set of slots that carry the PCH; and
  when the PCH collides with a physical multicast channel (PMCH):
    decode second data carried on the PMCH instead of the first data when the first data is determined to be decodable from the subset of slots that carry the PCH; and
    decode the first data instead of the second data when the first data is not determined to be decodable from the subset of slots that carry the PCH.

* * * * *